Oct. 14, 1924.
L. F. BLUME ET AL
1,511,717
ELECTRICAL APPARATUS
Filed Oct. 18, 1920      4 Sheets—Sheet 1
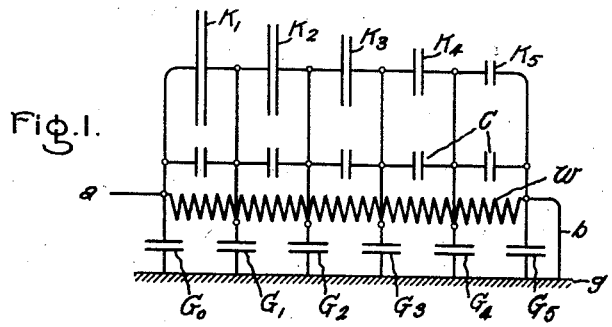
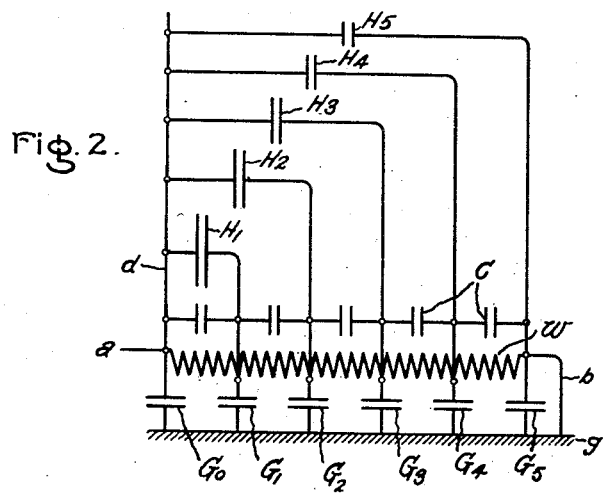
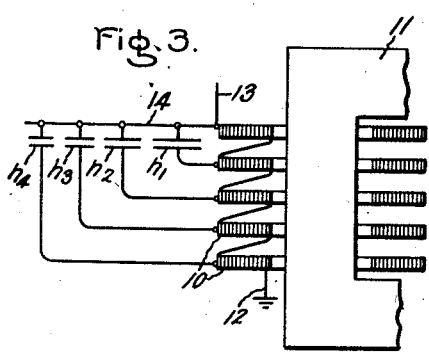
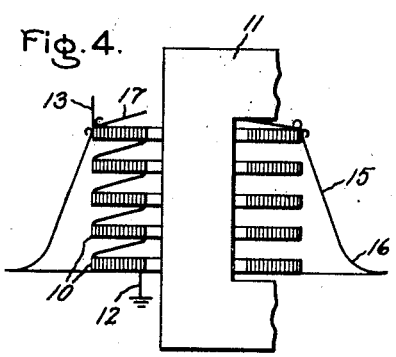
Inventors:
Louis F. Blume,
John S. Lennox,
by Albert G. Davis
Their Attorney.

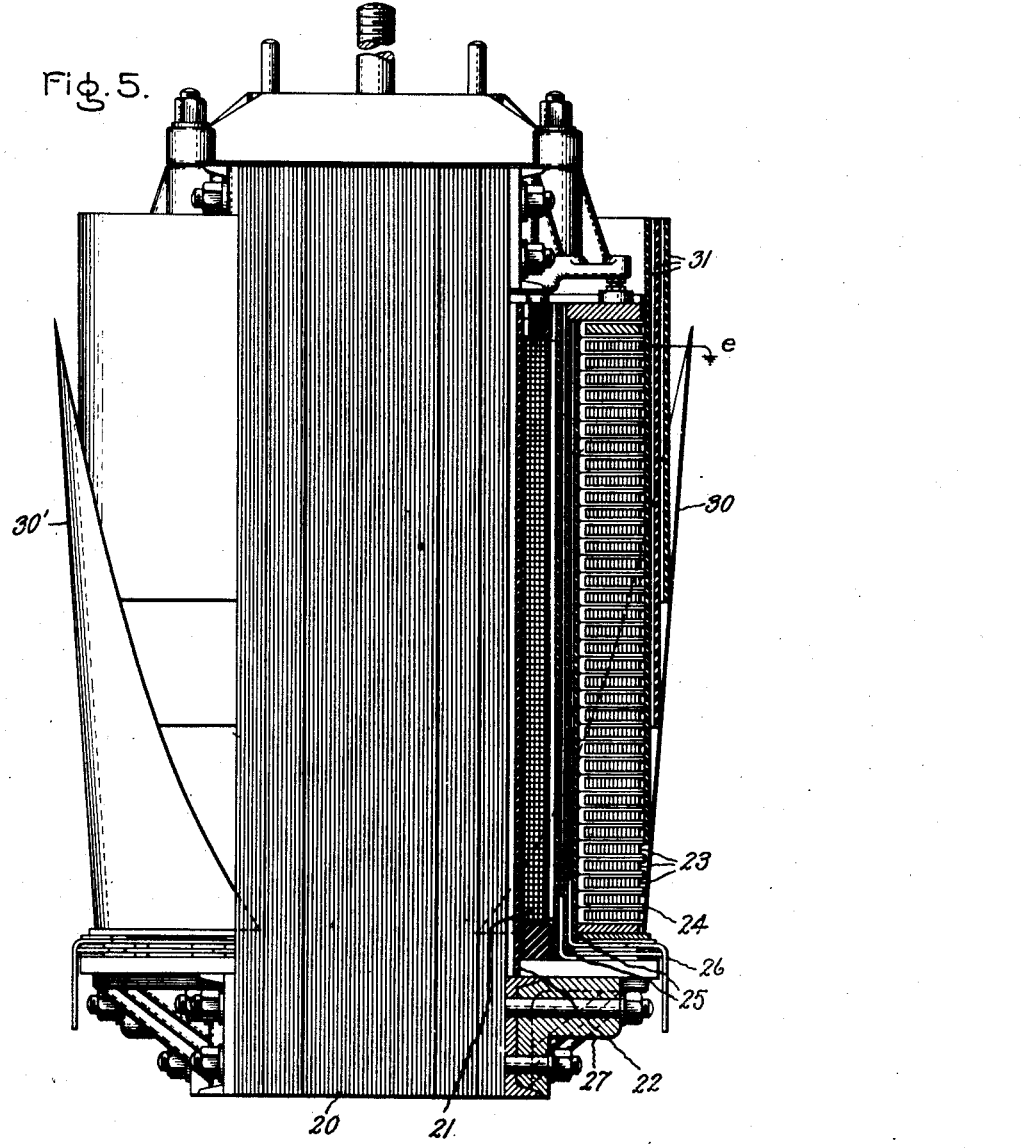

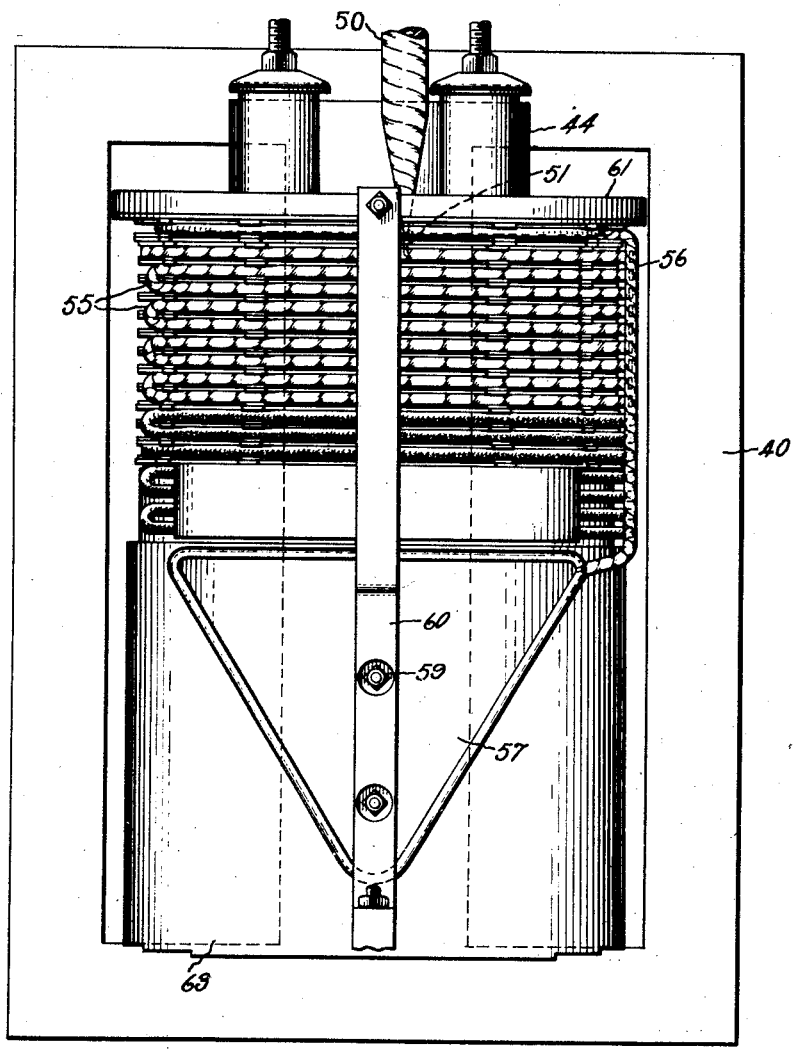

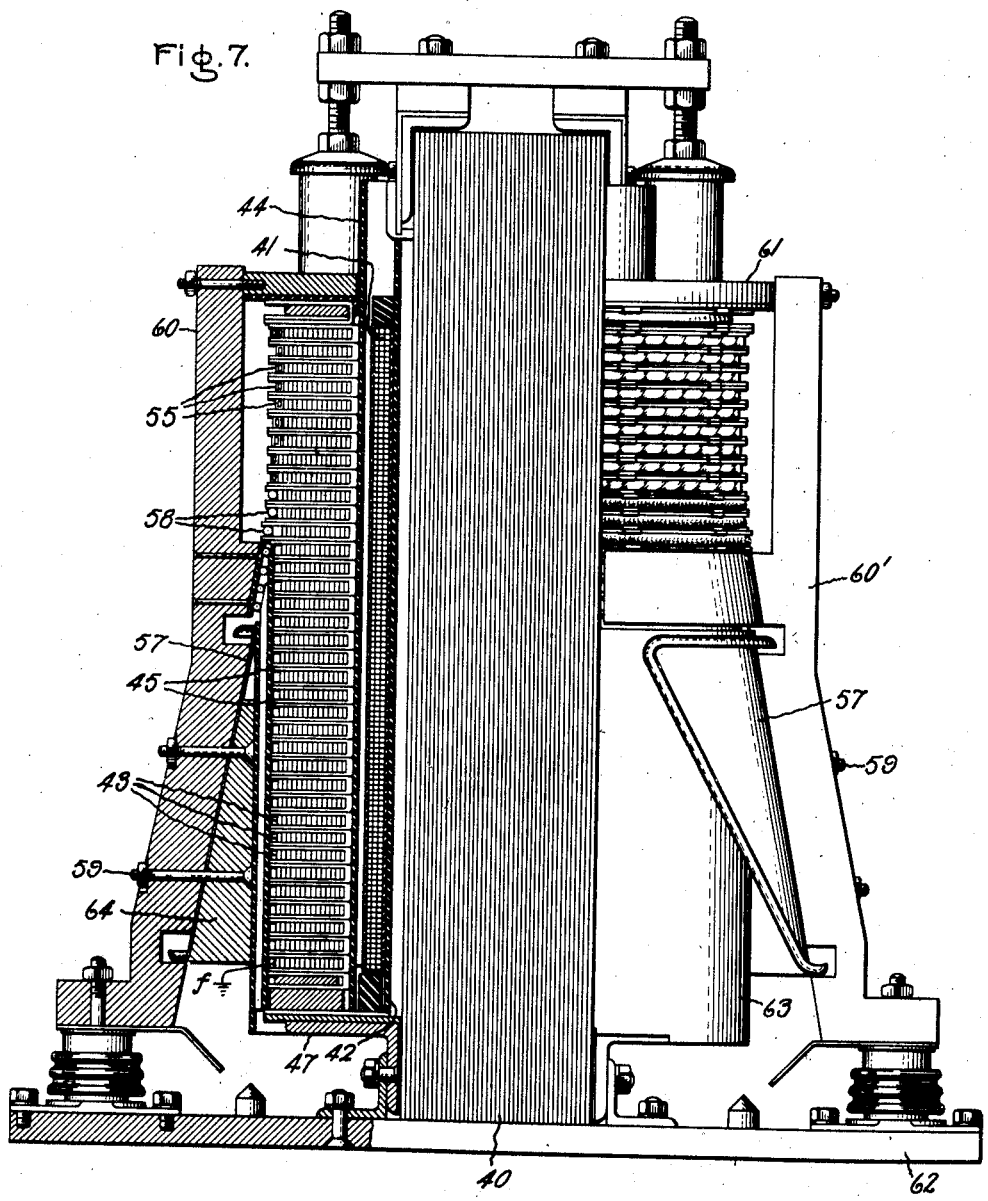

Patented Oct. 14, 1924.

1,511,717

UNITED STATES PATENT OFFICE.

LOUIS F. BLUME, OF PITTSFIELD, MASSACHUSETTS, AND JOHN S. LENNOX, OF NORWICH, CONNECTICUT, ASSIGNORS TO GENERAL ELECTRIC COMPANY, A CORPORATION OF NEW YORK.

ELECTRICAL APPARATUS.

Application filed October 18, 1920. Serial No. 417,704.

*To all whom it may concern:*

Be it known that we, LOUIS F. BLUME, a citizen of the United States, and JOHN S. LENNOX, a subject of the King of Great Britain, residing, respectively, at Pittsfield, county of Berkshire, State of Massachusetts, and at Norwich, county of New London, State of Connecticut, have invented certain new and useful Improvements in Electrical Apparatus, of which the following is a specification.

Our invention relates to electrical apparatus having windings with one end grounded and having distributed capacitance, and has for its general object an improved arrangement of parts for securing a desired initial voltage distribution. More particularly our invention relates to an improved protecting and voltage distributing means used in conjunction with the capacitance of the windings of stationary induction apparatus having one end grounded.

In an electrical winding, when an abrupt voltage or impulse is applied to its terminals, the initial voltage distribution is determined entirely by the capacitance present in the winding and not by the inductances. The capacitance of the winding consists of the entire series and parallel arrangement of capacity elements existing throughout the winding from one terminal to the other, including capacity from the winding to ground and capacity from one part of the winding to another. The charging of the various capacity elements to the respective potentials corresponding to the initial voltage distribution is effected by current which does not flow along the winding, or through its inductance, but only through other series elements of capacitance. The passage of such currents, in electrical apparatus as ordinarily designed causes a concentration of voltage at the line end of the winding. This voltage distribution is of very short duration, however, because as soon as the growing current flowing inductively through the winding can grow to an appreciable value the inductive effect of these growing currents causes a rapid modification of the initial voltage distribution. The reaction between the capacitance and inductive effects gives rise to oscillations within the winding, thereby causing an objectionable concentration of potential on the interior of the winding. Moreover, if the impulses are applied periodically at a frequency corresponding with the natural oscillating frequency of the transformer, the potential concentrations may grow very rapidly to values in excess of the ability of the insulation to withstand.

It has been discovered that if the capacitance associated with the inductance of any winding be disposed in such a manner that the potential gradient which would be produced by the capacitance alone is the same as that which would be produced by the inductance alone, then in the first place there will be no concentration of potential on the end turns of the winding due to the application of an abrupt impulse, and in the second place the internal oscillations produced by periodically applied impulses will be negligible; the application of which principle is set forth in the patent application filed in the name of J. M. Weed, Serial No. 354,896, on January 29, 1920. It has further been discovered that the desired distribution of capacitance, in electrical apparatus having one end grounded, can be accomplished in most cases by adding to the capacitance inherent in the apparatus an auxiliary capacitance, so disposed as to neutralize the tendency of the inherent capacitance of making the initial voltage distribution non-uniform.

By our invention these principles are applied in a manner yielding a cheap and readily manufactured arrangement of parts, the same giving a sufficiently close approximation to the ideal condition to meet all practical requirements. In carrying out our invention we employ an auxiliary condenser system comprising generally one element so shaped an spaced from the windings that when secured in position at one side of the winding it secures substantially the desired voltage distribution.

For a more complete understanding of the nature and objects of our invention, reference should be had to the following detailed description when taken in connection with the accompanying drawings, in which:—

Figs. 1 and 2 are explanatory diagrams, Fig. 3 shows in symbolic fashion an embodiment of our invention, Fig. 4 is a similar figure showing a modified arrangement, Fig. 5 is a view partly in section and partly in side elevation of a transformer constructed to embody our invention, and Figs. 6 and 7 are similar views of another embodiment of our invention as applied to transformers.

Referring now to the drawings, and to Fig. 1 in particular, we have indicated a winding at W, the elements of which are represented as having inherent series capacitance between the turns by the condensers shown at C, and inherent shunt or ground capacitance by the condensers shown at G. These latter condensers are represented as all connected with one common ground $g$. The winding W has one terminal $a$ leading to the line, the other being grounded and shown at $b$.

The capacitance of the auxiliary condenser system which it is necessary to associate with the winding W in order to make the voltage distribution electrostatically the same as that which exists due to the inductance alone is shown as comprising the elements $K_1$, $K_2$, $K_3$, etc. The condenser elements $K_1$, $K_2$, $K_3$, etc., are connected in series and are graded off at a uniform rate from the line end toward the ground end which is indicated by the difference in the size of these elements as shown; it is of course understood that the nearer to ground potential two adjacent turns or coils are the less shunt capacitance to ground need be compensated for, hence the reason for grading the sizes. Another way of stating this is that condenser $K_1$ must be of sufficient size to supply charging current to the condensers $K_2$, $K_3$, etc., and to the shunt condenser $G_1$, while condenser $K_2$ must be sufficient to supply charging current to condensers $K_3$, $K_4$, etc., and to the shunt condenser $G_2$. Thus as we progress toward ground end less charging current is needed for the series of condensers $K_2$, $K_3$, etc.

In Fig. 2 there is shown an equivalent arrangement of compensating capacitance, comprising the condensers $H_1$, $H_2$, $H_3$, etc., which are connected in parallel to each other and all supplied with charging current from the line $a$ through conductor $d$. Obviously, in this arrangement condenser $H_1$ should be only sufficient to supply condenser $G_1$ with charging current, and likewise condenser $H_2$ but sufficient to supply condenser $G_2$, etc.

In Fig. 3 we have symbolically depicted an application of this arrangement of an external condenser or condensers to a disc coil winding 10 on a core 11; which winding has one terminal grounded at 12, the other leading to the line at 13. The capacity elements $h_1$, $h_2$, $h_3$, etc. of the external condenser are shown as connected in parallel to the line lead 13 through conductor 14, while the other sides of the elements are conductively related to progressive points in the winding 10. This symbolic depiction of an arrangement of capacity elements, to effect a voltage distribution electrostatically in winding 10 which would be the same as that due to the inductance were the capacity non-existent, is the arrangement invariably employed in the practice of our invention.

In Fig. 4 is shown a winding provided with a single metallic condenser element for securing the capacity distribution symbolically depicted in Fig. 3.

Here the winding 10 is shown on core 11, having an end grounded at 12, the other leading to the line at 13 as before. A generally conical metallic plate 15 is disposed about but does not entirely encircle the winding 10, the smaller end of the cone fitting against the line or top turn of the winding 10 and being conductively related thereto. The lower end 16 of the cone is belled out in order to approximate the rapid diminution of the capacity required at ground end.

To shield completely a grounded winding in accordance with our invention, we contemplate the use of a conical end plate, as indicated at 17, to be used in conjunction with the element 15; such end plate being described in the application for U. S. Letters Patent filed by J. M. Weed, Ser. No. 396,585. This end plate, however, may be omitted and is not shown in the further views of the drawings in the interest of clearness.

In Fig. 5 we have illustrated our invention applied to a transformer in a more practical form of condenser device than that shown in Fig. 4.

In Fig. 5 a three-legged core 20 is represented as having windings surrounding its central leg. These winding are represented as comprising a low voltage cylindrical winding 21 supported in the desired spaced relation from the central leg by means of the insulating cylinder shown at 22. The high voltage winding comprises disc coils 23 supported in proper spaced relation by means of the spacing devices 24 which abut at the rear against insulating cylinders 25 placed between the high and low voltage windings.

The high voltage winding 23, as shown, has its grounded end at the top as indicated symbolically at $e$ so that the coils of greatest potential elevation above ground are at the bottom. Consequently the insulating barriers shown at 26 are inserted between the lowermost coil and the coil supporting abutments 27 on the lower end of the core.

To effect substantially the desired voltage distribution in this transformer according to our invention, two substantially triangular metallic plates 30 and 30' are secured, one at each side, on the coil stack adjacent the high voltage winding, and are conductively related to the lowermost coil.

As previously indicated, the coils at greatest potential elevation have associated therewith the capacity elements of greatest capacitance. Accordingly, the lowermost coil has the lower end of plates 30 and 30' nearest to it and also has adjacent to it the greatest peripheral extent of the plates 30 and 30′; that is, the bases of the triangular configuration of these plates follow the circumference of the coil. The coil next to the bottom, by the arrangement previously symbolically depicted, has less capacitance associated with it so that the plates 30 and 30′ are spaced further from it than from the bottom one; also there is less of the peripheral extent of these plates associated with the second coil. This gradual decrease in the capacity elements to be associated with the coils 23 as we approach ground potential occasions the general triangular configuration of the plates 30 and 30′. While these plates will in general have this particular configuration it is merely incident to the design in properly proportioning the capacitance among the turns and we do not intend to be limited thereby to any specific configuration of plates, but propose to alter the same as the exigencies of the case may indicate.

Insulating cylinders 31 are shown as surrounding the upper end of high voltage coils 23, and are employed partly for protecting and insulating purposes and also for aiding in securing the proper spacing of the plates 30 and 30′ from the coil stack.

In Figs. 6 and 7 we have shown another arrangement for applying our invention to transformers. Here again, a three-legged core 40 has windings supported about its central leg. The low voltage winding 41 is of the cylindrical type and is supported in proper spaced relation to the core by insulating cylinder 42, which winding in turn is separated from the high voltage winding comprising coils 43, by the insulating cylinder 44. The coils 43, are shown as before, spaced apart by spacing devices 45 and supported by coil supporting abutment 47.

The upper end of the coil stack in this instance is connected to the line, as indicated by the lower end of the bushing structure 50 which has a conductor 51 leading therefrom to the winding. The ground connection is at the lower end as indicated symbolically at $f$ in Fig. 7.

The voltage distributing and shielding device here employed is not wholly a solid plate but is in part what may be termed a "skeleton condenser" element and has the obvious advantage that it in no wise impedes the free circulation of the cooling and ventilating medium, such as oil in which the transformer is submerged; one element being disposed on each side of the coil stack.

This so-called "skeleton condenser" element is composed of suitably arranged conductors. The conductors here employed are strap conductors, shown at 55 of U-shaped configuration having each leg disposed adjacent the periphery of a coil 43. The ends of the legs of each U at 55 are conductively anchored in a trunk-conductor 56 which extends from the lead 51 down along one side of the coil stack to the solid or plate portion of the condenser element shown at 57, with which it is conductively connected. A portion of the U's employed may be and preferably are formed of round conductors as shown at 58 and comprise an intermediate portion of the device. Round conductors can with advantage be employed where it is not desired to have the capacity elements as closely associated with the coils 43 as at the top.

The portion of the condenser element shown at 57 is of triangular configuration and is held in proper spaced relation to the windings by any suitable construction, that shown comprising vertically disposed braces 60 and 60′ which are secured at their tops to the coil clamping ring 61 on opposite sides and at their bottoms to the core supporting base 62. These braces are preferably made of insulating material, for instance paraffin treated wood, and have a shape on their inner sides, such that when the plates 57 are drawn up thereagainst as by bolts 59, the plates are held in proper spaced relation to the coils 43. Between coils 43 and each plate 57 are one or more insulating cylinders such as are shown at 63; the space between a cylinder 63 and a plate 57 under a brace 60 being preferably made solid by the insertion of a suitably shaped insulating element, such as we have shown at 64 in Fig. 7.

The condenser elements which were just described are substantially similar on each side of the transformer but have independent electrical connections with the line lead 51; the arrangement shown providing the proper grading of capacity elements associated with the coils 43 as we pass from line potential to the ground end of the coil stack.

The use of tapered condenser elements in conjunction with a grounded winding, such as we have described, imposes a voltage distribution electrostatically throughout the winding to be protected which substantially coincides with that due to the inductance of the winding when considering the capacitance as non-existent; hence there is no tendency during the interval when steep wave fronts and like transients traverse the winding for capacity charging current to surge from one portion of the winding to another and thus set up resonant oscillations.

Having now described several embodiments of our invention which are at present the best means known to us for carrying the same into effect, we would have it understood that these are merely illustrative and that we do not mean to be limited thereby to the precise details shown, nor restricted in the choice of recognized equivalents except as defined in our claims hereunto annexed.

What we claim as new and desire to secure by Letters Patent of the United States, is:—

1. In an electrical apparatus, the combination with a winding having one end connected to ground, of a condenser element disposed adjacent said winding comprising a metallic plate gradually and progressively tapered away from the winding as the ground end is approached.

2. In an electrical apparatus, the combination with a winding having one end connected to ground, of a condenser element disposed adjacent said winding and comprising a metallic plate of generally triangular configuration having its base conductively connected to the line end of the winding and its longitudinal extent progressively spaced from the winding as the ground end is approached.

3. In a stationary induction apparatus, the combination with a core, of a high voltage winding thereon having one end connected to ground, and an auxiliary condenser system comprising a substantially triangular conducting plate disposed adjacent said winding, conductively connected to the line end thereof and having its apex disposed adjacent the ground end and progressively spaced therefrom as the ground end is approached.

In witness whereof, we have hereunto set our hands and seals respectively the 29th day of Sept., 1920; and the 11th day of October, 1920.

LOUIS F. BLUME.
JOHN S. LENNOX.